US006254711B1

(12) United States Patent
Bull et al.

(10) Patent No.: US 6,254,711 B1
(45) Date of Patent: Jul. 3, 2001

(54) METHOD FOR MAKING UNIDIRECTIONAL GRAPHIC ARTICLE

(75) Inventors: Sally J. Bull; Ernest M. Rinehart, both of North St. Paul; Kenneth D. Wilson, May Township, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/094,895

(22) Filed: Jun. 15, 1998

(51) Int. Cl.$^{7}$ .............................. B44C 3/02; G02B 17/00

(52) U.S. Cl. .......................... 156/234; 156/239; 156/241; 156/247; 156/252

(58) Field of Search .................................... 156/247, 239, 156/240, 241, 252, 344, 234

(56) References Cited

U.S. PATENT DOCUMENTS

| | | |
|---|---|---|
| 3,691,140 | 9/1972 | Silver . |
| 4,358,488 | 11/1982 | Dunklin et al. . |
| 4,421,816 | 12/1983 | Arnold . |
| 4,673,609 | 6/1987 | Hill . |
| 4,952,783 | 8/1990 | Aufderheide et al. . |
| 5,468,532 | 11/1995 | Ho et al. . |
| 5,550,346 | 8/1996 | Andriash et al. . |
| 5,582,434 | 12/1996 | Skov et al. . |
| 5,588,679 | 12/1996 | Skov et al. . |
| 5,679,435 | 10/1997 | Andriash . |
| 5,769,436 | 6/1998 | Andrey . |
| 5,773,110 | 6/1998 | Shields . |

FOREIGN PATENT DOCUMENTS

| | | |
|---|---|---|
| 2 244 585 | 12/1991 | (GB) . |
| WO 95/23034 | 8/1995 | (WO) . |
| WO 96/06745 | 4/1996 | (WO) . |
| WO 96/11798 | 4/1996 | (WO) . |
| WO 97/29916 | 8/1997 | (WO) . |
| WO 97/43128 | 11/1997 | (WO) . |

OTHER PUBLICATIONS

Brochure: Cadillac Plastic and Chemical Company, Clear Focus™ Film (1995).

Brochure: Cadillac Plastic and Chemical Company, Laser-Visions™ Perforated "Retro–Reflective" Marking Film$^{PAT}$.

*Primary Examiner*—Sam Chuan Yao
(74) *Attorney, Agent, or Firm*—Dale A. Bjorkman

(57) ABSTRACT

The present invention relates to graphic or informational articles that may be applied to a surface of a translucent or substantially clear substrate so that the image may be viewed through the substrate. The present invention is an indoor advertising system or kit that includes two components. The first component is a substantially clear, perforated imageable film layer with a perforated adhesive layer on a surface thereof. The second component is a non-perforated colorant transfer component that includes a removable carrier film with at least one color layer on a surface thereof. The present invention further includes a process for making the graphic articles. In the process of the present invention, an image layer is formed on a first major surface of a substantially clear, perforated imageable film layer. A colorant transfer component with at least one colored layer comprising a pigment is laminated to the imageable film layer such that the at least one colored layer is adhered to the unperforated areas of the image layer. The colorant adheres to the unperforated land areas of the image layer without significant bridging across the apertures of the image layer.

13 Claims, 6 Drawing Sheets

METHOD FOR MAKING UNIDIRECTIONAL GRAPHIC ARTICLE

FIELD OF THE INVENTION

The present invention relates to graphic or informational articles that may be applied to a surface of a translucent or substantially clear substrate so that the image may be viewed through the substrate. More particularly, the present invention relates to an indoor advertising system or kit. Even more particularly, the present invention relates to graphic articles that include two components. The first component is a substantially clear, perforated imageable film layer with a perforated adhesive layer on a surface thereof The second component is a non-perforated colorant transfer component that includes a removable carrier film with at least one color layer on a surface thereof.

The present invention further includes a process for making the graphic articles. In the process of the present invention, an image layer is formed on a first major surface of a substantially clear, perforated imageable film layer. A colorant transfer component with at least one colored layer is laminated to the imageable film layer such that the at least one colored layer is adhered to the unperforated areas of the image layer. The colorant adheres to the unperforated areas of the image layer without significant bridging across the perforated areas of the image layer.

When the graphic articles of the present invention are mounted on a substrate, an observer on one side of the substrate may view an image or a message through the substrate. An observer on the opposite side of the substrate enjoys a substantially unobstructed view through the image and the substrate.

BACKGROUND OF THE INVENTION

Advertisers and merchants desire the ability to display graphic and/or informational images on a wide variety of surfaces. In recent years, transparent surfaces such as, windows, walls, and the like, have attracted a great deal of attention as substrates for advertising media. If a graphic image is applied to a transparent substrate, it is desirable that the image be visible when viewed from one side of the window while leaving the window and image substantially transparent when viewed from the other side of the window. Thus, for example, if the image is to be mounted on a window of a vehicle, such as a bus or taxicab, it is desired that passengers be able to see clearly through the window, while pedestrians outside of the vehicle see the graphic image.

Graphic articles achieving the effect typically are multilayer film constructions with an opaque (light colored, usually white) film adapted to receive an image on one surface and a light absorbing (dark, usually black) film or ink applied to the opposite surface. A pressure sensitive adhesive and removable backing, or carrier, material is applied to the dark film or ink which allows the printed graphic to be handled and applied to a window.

Numerous perforations through the film layers create an optical illusion of "transparency" through the graphic article. The perforations are sized and spaced such that, when observed from the imaged side, a viewer has a tendency to focus on the image. However, when observed from the relatively darker side, the viewer has a tendency to see through the graphic article, leaving the window unobstructed. In addition, it is well known that windows appear dark or opaque when viewed from an area of relatively bright ambient light into a relatively darker area. When viewed from an area of relatively dark ambient light into a relatively brighter area, the windows appear transparent. The unidirectional effect of the graphic article is enhanced by this effect, which allows viewers in relatively darker areas, such as the interiors of vehicles and buildings, to see through the unidirectional graphic article, while viewers in relatively brighter ambient light will see the printed graphic.

Parties other than the film manufacturer typically image unidirectional graphic articles of the type described above. Since the film cannot be imaged through the adhesive and backing material, the image and backing material must be applied to the light side of the film. The graphic articles are then mounted on a window so that the imaged surface may be viewed directly and the dark surface may be viewed through the glass (referred to as a "first surface" application). As a result, when the window is a barrier between the indoors and the outdoors, the unidirectional film must be applied to the exterior of the window with the imaged surface exposed to the outside environment. Unfortunately, in some applications, exposure of the imaged surface of the graphic article to the environment is not ideal since the image must be durable, resistant to ultraviolet and other ambient light, and weatherable. Additionally, dirt and other contaminants may become entrapped within the perforations of the film and adhere to the pressure sensitive adhesive against the window, reducing the service life of the graphic article. Although application of a clear, un-perforated protective layer over the imaged surface may improve service life under certain conditions, such layers are expensive and require additional process steps that may be difficult for the end-user to perform.

To avoid the problems created by exposure of the imaged surface of the graphic article to the environment, it is desirable that the image be viewable through the transparent substrate (referred to as a "second surface" application). For example, the graphic article may be applied to the interior of a window so that the image may be viewed through the window glass by observers outside a building. However, to occupants of the building, the view outward through the window glass will be relatively unobstructed. This mounting procedure allows the window glass itself to act as a protective barrier for the imaged surface of the graphic article.

WO 96/11798 illustrates in FIG. 6C an example of an interior mount graphic article with an image that may be viewed unidirectionally. This article includes a single transparent panel 12 with a color image layer 22 applied on a first surface. The second surface of the image layer 22 includes an adhesive layer 48 that may be protected by an optional peel-off liner layer 50. A light absorbing (black) paint layer 24 is applied over the image layer 22. The entire construction is perforated with through holes 42. As shown in FIG. 6D of WO '798, the liner layer 50 may be removed and the perforated construction may be attached to an interior surface of a window using the adhesive layer 48.

Unidirectional graphic articles sold by Cadillac Plastic and Chemical Co. under the trade designation Interior Mount Clear Focus Film include a transparent, perforated poly (vinyl chloride) (PVC) reverse imaged on one surface. The surface of the PVC film opposite the image includes a pressure sensitive adhesive layer that may be used to mount the graphic article on an interior surface of a window. After imaging, the imaged surface of the PVC layer is screen printed (flood coated) first with an opaque layer of white ink, and next is screen printed (flood coated) with a layer of black ink. Following the flood coating steps, the graphic article may be applied to an interior surface of a window with the pressure sensitive adhesive.

U.S. Pat. No. 5,769,436 to Andriash illustrates in FIG. 2 a unidirectional interior mount graphic article 14 with a retro-reflective opaque sheet 12. The opaque sheet 12 is imaged on a first surface and includes a dark adhesive layer 15 on a second surface. A double-sided transparent transfer adhesive 13 is placed over the image surface of the sheet 12 after printing. The composite structure is then perforated with a laser. A clear laminate 19 may be adhered to the black adhesive layer 15 to seal the structure and prevent entry of dirt into the perforations. The graphic article 14 may then be mounted on an interior surface of a window with the transfer adhesive 13.

It is well known in the signage industry that advertisers and merchants prefer graphic articles that may be prepared at a local print shop. This ensures that the articles will be easily updateable and printable with a wider variety of custom images at a reasonable cost. While the currently available interior mount unidirectional graphic articles perform well, these articles are difficult for an end user to prepare with commonly available printing equipment. Applying a dark paint layer on the image as in WO '798, or flood coating white and/or black layers over the image, requires specialized printing equipment and inks that are unavailable and/or too expensive for many end users. In addition, unless specialized inks and screen printing equipment are used, in many cases these coating steps do not adequately cover the image layer, which results in a less than satisfactory image. The construction described in the '436 patent avoids these problems, but requires laser perforation following the imaging step. This is not feasible for the typical end user.

SUMMARY OF THE INVENTION

A unidirectional graphic article is needed that may be easily imaged by the end user to form a custom image. The graphic article must be simple to prepare with commonly available printing and lamination equipment and should not require the end user to perform complex printing steps, flood coating steps, or laser perforation steps.

The present invention addresses these needs and provides a unidirectional graphic or informational article that may be applied to a surface of a translucent or substantially clear substrate so that the image may be viewed through the substrate. If the substrate is a window, an image formed on the article may be viewed from the opposite side of the window from which the article is mounted, while leaving a substantially unobstructed view when viewed through the side on which the film is mounted. In the industry, a graphic article applied to one side of a window that has an image to be viewed from the opposite side of the window is called a "second surface" application.

The present invention is an indoor advertising system or kit that includes a multi-component graphic article. The graphic articles in the system include two components, an imageable component and a colorant transfer component. The imageable component is a perforated, substantially clear imageable film layer with a perforated, substantially clear adhesive layer on a surface thereof. The colorant transfer component includes a removable carrier film layer with at least one colored layer on a surface thereof. The colored layer typically comprises a pigment, and may be light absorbing, light reflecting, or prepared to provide any desired appearance on the graphic article.

The present invention also includes a method for preparing this graphic article. In the method of the present invention, an imageable component comprising a perforated, substantially transparent imageable polymeric film layer is imaged on its first major surface by any conventional printing technique to form an image layer. The image layer includes at least two colors, preferably four or more colors, and is formed in the land areas surrounding the perforations in the surface of the imageable film layer. Following the imaging step, a colorant transfer component comprising a temporary, removable carrier film with at least one color layer comprising a pigment is laminated to the imageable component. The temporary carrier film is removed, and the colored layer(s) adhere to the unperforated land areas of the image layer. Substantially no colorant is adhered to the open apertures in the imagable layer.

The colorant transfer component may have a single colored layer on the carrier film, or may include multiple color layers to provide a wide range of colors and effects to the graphic article. The multiple color layers may be adhered to the image layer in a single lamination step, or the color layers may be applied one at a time in successive lamination steps.

In a preferred embodiment, a first opaque color layer comprising a light reflecting pigment is transferred by hot lamination on top of a completed image layer on a first major surface of the imageable film layer. When the carrier film is removed, the light reflecting color layer adheres to the unperforated land areas of the image layer. Substantially no colorant is adhered to the open apertures in the imagable layer.

Next, an opaque color layer comprising a light absorbing pigment is then transferred by hot lamination on top of the light reflecting layer. When the carrier film is removed, the light absorbing color layer adheres to the unperforated land areas of the light reflecting color layer. Substantially no colorant is adhered to the open apertures in the light reflecting color layer.

A perforated layer of a substantially clear adhesive on a second major surface of the imageable film layer may be used to attach the graphic article to the transparent substrate. When so mounted, an observer on one side of the substrate may view an image or a message through the substrate, and an observer on the opposite side of the substrate enjoys a substantially unobstructed view through the image and the substrate.

EMBODIMENTS OF THE INVENTION

Figure 1:
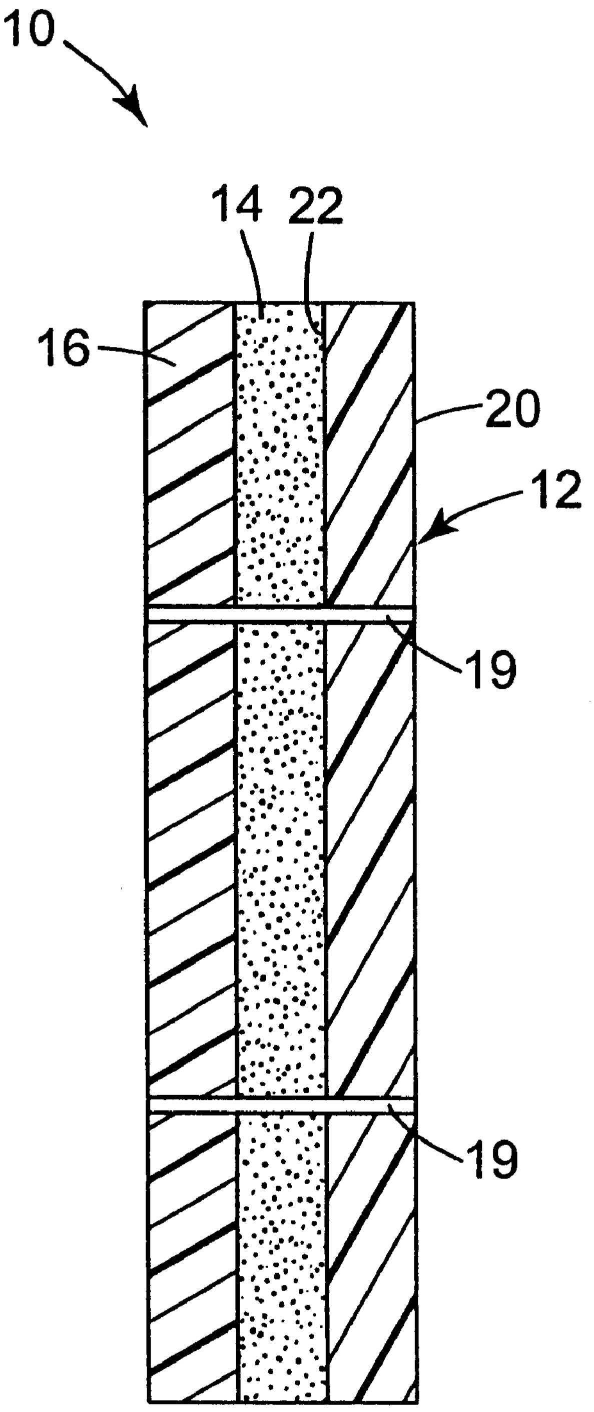
FIG. 1 is a schematic, cross sectional view, prior to imaging, of an imageable component for use in the present invention.

The process of the present invention utilizes two components: a perforated imageable component and a colorant transfer component. FIG. 1 is a schematic, cross sectional view of an imageable component 10 prior to imaging. As shown in FIG. 1, the imageable component 10 includes a perforated, substantially clear imageable film layer 12, a perforated, substantially clear adhesive layer 14, and an optional release liner 16. The term substantially clear or transparent as used herein means that an image layer applied on a surface of the imageable film layer 12 can be viewed through the imageable film layer 12 and/or the adhesive layer 14 such that image is not substantially obscured. The polymeric films selected for the imageable film layer may vary widely depending on the intended application, but vinyl films and polyolefin films are preferred. Vinyl films containing poly(vinyl chloride) (PVC) copolymers are particularly preferred. The films may be covered on their exposed surfaces by optional protective paper liners (not shown in FIG. 1). The imageable film layer 12 is provided with a first major surface 20 and a second major surface 22. The first major surface 20 of the imageable film layer 12 is designed to have printed thereon an image with at least two colors, preferably four or more colors. As is well known in the art, the surfaces of the imageable layer 12 may be modified or may include additional layers to enhance adhesion of a particular ink, dye or toner.

Figure 3:
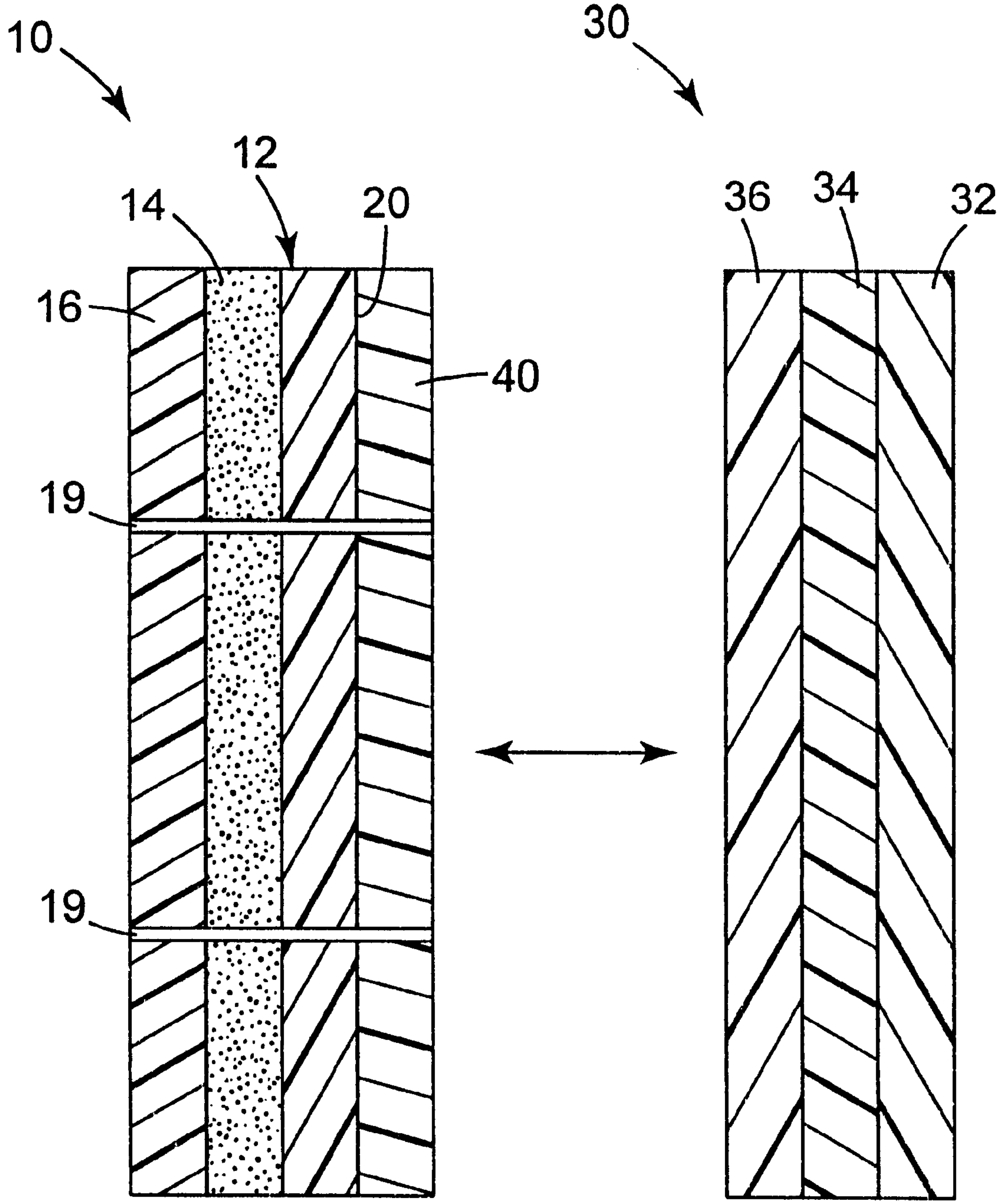
FIG. 3 is a schematic representation of the lamination step of the process of the present invention.

The adhesive layer 14 is applied to the second major surface 22 of the imageable film layer 12. The adhesive layer 14 is used to attach the graphic article produced by the process of the present invention to a substantially transparent substrate. Any known adhesive may be used, as long is it is substantially clear so that an image on the imageable film layer 12 is not obscured when the completed graphic article is attached to the substrate. It is also particularly preferred that the adhesive used to form the adhesive layer 14 be removable from a selected substrate. As used herein, the term removable means that the adhesive layer 14 should preferably be selected to permit the graphic article of the present invention to be easily removed from a substrate without leaving substantial adhesive residue on the substrate. Polyurethane based adhesives and acrylic pressure sensitive adhesives have been found to work well to form the adhesive layer 14, and acrylic pressure sensitive adhesives are preferred. An optional release liner 16 may protect the adhesive layer 14. Useful liners include silicone coated paper, polymeric films or coated papers reinforced with polymeric films. The liners may be perforated (FIG. 1) or unperforated (FIG. 3).

To provide the graphic articles of the present invention with unidirectional properties, the imageable film layer 12 and the adhesive layer 14 are perforated with a plurality of perforations or apertures 19. The diameter of each aperture 19 may vary widely depending on the required density to match the desired viewing distance. The apertures 19 may be circular, square, triangular or any other shape, and may form a regular or irregular repeating pattern. Preferably, the apertures 19 are circular and have a diameter of about 0.03 to about 0.25 inches (0.08 to 0.64 cm), with a diameter of about 0.06 inches (0.15 cm) being preferred for most second surface window applications. Within these ranges, about 10–70% of the surface area of the imageable film layer 12 will comprise open space, and the remainder of the surface area of the imageable film layer 12 will form corresponding land areas surrounding the apertures. It is preferred that about 50% of the surface area of the imageable film layer 12 comprise open space. The perforations may be made in any conventional manner, such as by die cutting, punching, or with a laser.

Useful imageable components include, for example, perforated clear vinyl films available from 3M Company, St. Paul, Minn., USA (3M) under the trade designation Scotchcal Marking Film. Scotchcal V6089 is particularly preferred.

Figure 2A:
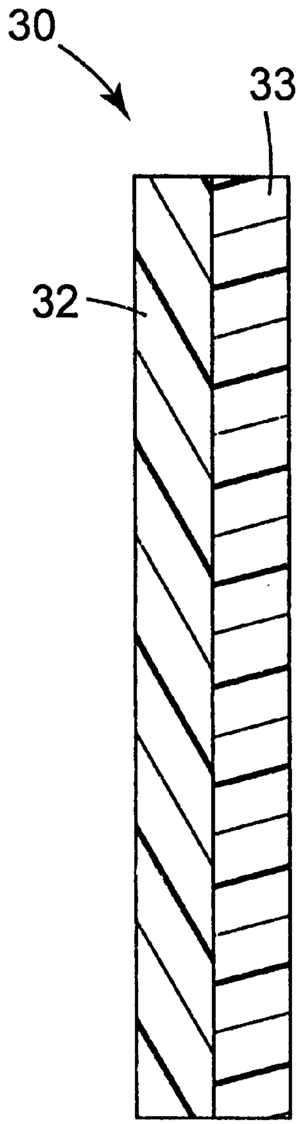
FIG. 2A is a schematic, cross-sectional view of a colorant transfer component for use in the present invention.

The second component used in the process of the present invention is a colorant transfer component 30 illustrated schematically in FIG. 2A. The colorant transfer component 30 includes a temporary carrier film layer 32 made of a polymeric film, typically a polyester film. Coated on the carrier film layer 32 is at least one layer of a colorant 33. The colorant layer 33 preferably is a powdered pigment layer that includes pigment particles and an optional binder (not shown in FIG. 2A). Any pigment or pigment/binder combination may be used in the pigment layers coated on the carrier film layer 32, as long as the pigments and/or binders will adhere to an image layer to be printed on the first major surface 20 of the imageable component 10 (See FIG. 1). As is known in the art, the particles and binders making up the pigment layers may be engineered to provide any desired appearance or finish to the layer. Any number of pigment layers may be applied to the carrier film layer 32, and these pigment layers may be colored, arranged or layered to provide any desired effect.

Figure 2B:
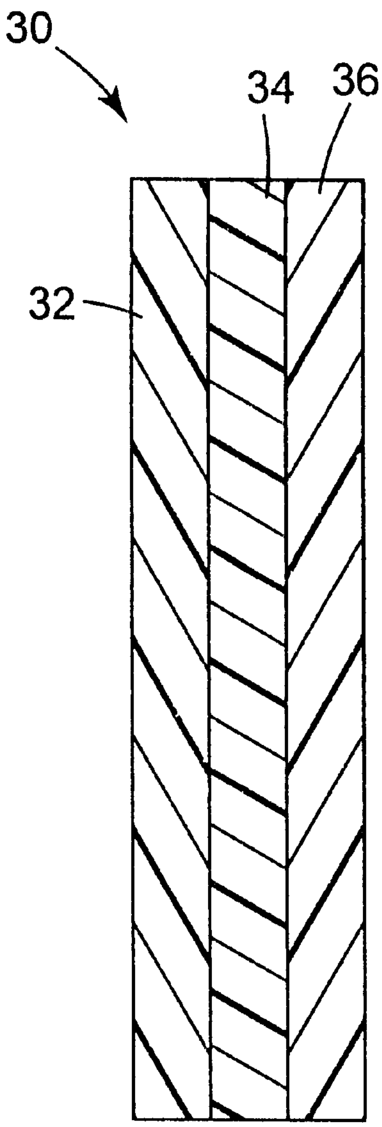
FIG. 2B is a schematic, cross-sectional view of a colorant transfer component for use in the present invention.

In a preferred embodiment shown in FIG. 2B, two pigment layers 34, 36 are applied to the carrier film layer 32. The first pigment layer 34 applied on the carrier 32 is an opaque, light absorbing pigment. Typically, the light absorbing pigment layer 34 is darkly colored, preferably black. The pigment layer 34 may be engineered to provide any desired appearance or finish, and a matte finish is desired for most second surface window applications. The use of the pigment layer 34 permits control over the finish of the opaque layer as desired for a particular application. Typically, conventional screen printed black ink layers provide only a glossy finish, so this measure of control is not available with conventional processes. This is particularly important since the light absorbing pigment layer 34 is normally exposed to the viewer when the completed graphic articles produced by the process of the present invention are used in second surface window applications.

The second pigment layer applied over the light absorbing pigment layer 34 is a light reflecting pigment layer 36. Typically, the light reflecting pigment layer 36 is lightly colored, preferably white. The pigment layer 36 may be engineered to provide any desired appearance or finish.

Figure 2C:
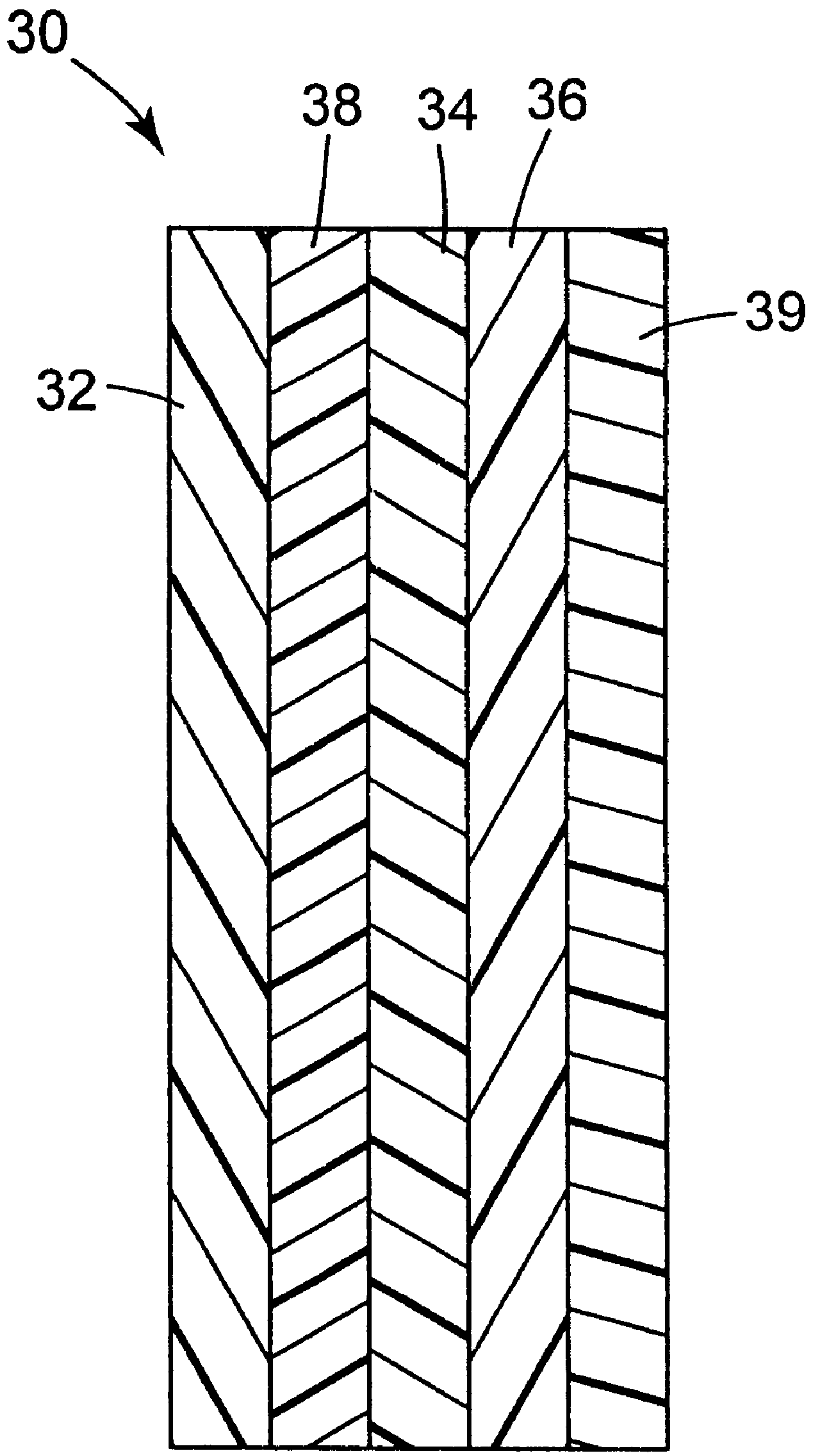
FIG. 2C is a schematic, cross-sectional view of a colorant transfer component for use in the present invention.

As shown in FIG. 2C, if desired, a second light reflecting pigment layer 38 may be applied to the carrier film layer 32 between the carrier film layer 32 and the light absorbing pigment layer 34. The pigment transfer component 30 may also include optional patterned layers 39 that may be used to transfer a translucent "holographic" pattern to an image formed on the imageable component 10. The "holographic" pattern may be used to provide a decorative effect, or for product identification or security purposes.

Suitable pigment transfer components for use in the process of the present invention are the "transfer print foils" available from Transfer Print Foils, Inc. East Brunswick, N.J., USA, under the trade designations FL 700 006 and AG6 298 897 (white), IPT 100 726FP and 9E4C (black), and PR9 098 001 126 and DHP 174 001 567 (holographic). These pigment transfer components generally consist of layers of dry pigments that are powder coated on a polymeric film carrier, typically a polyester.

To create a graphic article using the process of the present invention, the end user may use an indoor advertising system that includes the two principal components described above—an imageable component and a colorant transfer component. To create a graphic article, the end user must first image the imageable component 12. As shown in FIG. 3, a reverse image layer 40 is formed on the first major surface 20 of the imageable film layer 12. Since the imageable film layer 12 is perforated with a plurality of apertures 19, the image layer 40 will be discontinuous, i.e., not be formed in the apertures, but only in the land areas surrounding the apertures. When the completed graphic article prepared by the process of the present invention is viewed closely, the apertures 19 will be apparent and the image will appear discontinuous. However, at a normal viewing distance from the graphic article, the human eye will act to resolve the discontinuous image into a continuous image, and the apertures 19 will not be visible.

The image layer 40 may include one or more color layers, any of which can be applied continuously or discontinuously to form an informational or decorative design. The specific number of color layers used for a particular application can be dictated by the desired visual impact of the graphic article, printing costs, and the like. However, several color layers are particularly preferred to provide an image layer with significant advertising impact. These multi-color image layers are typically digitally created and applied in one pass through a large format printer to provide an image with photograph-like realism.

The color layers making up the image layer 40 can be applied by any known printing or painting method for forming an image on a polymeric film, including, for example, screen printing, electrographic (electrostatic and electrophotographic) printing, offset printing, thermal ink jet printing, piezo ink jet printing, or thermal mass transfer. A preferred printing process for vinyl base layers is the electrostatic printing process available from 3M, St. Paul, Minn., USA, under the trade designations "Scotchprint" and "Scotchprint 2000."

As is well known, the color layers useful in the present invention can be provided as an aqueous solution, emulsion or dispersion comprising a binder, a color agent and various optional ingredients. As described in, for example, U.S. Pat. No. 5,468,532 to Ho et al., which is incorporated herein by reference, suitable color layer compositions can be engineered to provide specific benefits to the image layer. For example, the binder or binders selected for use in the color layers can display hot melt adhesive properties and can be blended to improve the tensile strength, heat resistance, and environmental resistance of the color layer, as well as its adhesion to the base layer or image-protective surface layers. The binder used in the color layers can be crosslinked to alter the modulus, the dimensional stability in response to temperature and humidity, melting temperature, tensile strength, adhesion or heat resistance of the image layer. Other optional additives which can be incorporated into the color layer include cosolvents, defoamers, surfactants, antioxidants, light stabilizers, ultraviolet light absorbers, biocides and the like.

The purchaser will typically digitally image the imageable component 10, and any custom advertising message may be printed thereon by any conventional printing method on commonly available printing equipment. For example, electrostatic transfer for digital imaging employs a computer to generate an electronic digital image, an electrostatic printer to convert the electronic digital image to a multicolor toned image on a transfer medium, and a laminator to transfer the toned image to a durable substrate. Electrostatic printing systems include those available from 3M, St. Paul, Minn., USA under the trade designation "Scotchprint Electronic Graphics System." In this system a personal computer is used to electronically store and manipulate images. Suitable electrostatic printers include single-pass printers and multiple pass printers. Single Pass Printers include the machines available under the trade designations "9510" and "9512" from Nippon Steel Corporation of Tokyo, Japan, and those available under the trade designations "Scotchprint 2000 Electrostatic Printer" from 3M, St. Paul, Minn., USA. Suitable multiple-pass printers include those available under the trade designation "Model 8900 Series" printers from Xerox Corporation of Rochester N.Y., USA and those available under the trade designation "Model 5400 Series" from Raster Graphics of San Jose, Calif., USA. Suitable piezo ink jet printers include the 5000 series from Raster Graphics, San Jose, Calif., USA, as well as printers available from Gerber, Inc., Burlington, Mass., USA, and Xerox Corporation, Stamford, Conn., USA.

Examples of suitable electrostatic toners include those available under the trade designations "Model 8700 Series" toners from 3M, St. Paul, Minn., USA, and suitable transfer media include those available under the trade designations "Model 8600" media (e.g., 8601) from 3M.

Following the imaging step to form the image layer 40, the imageable component 10 and the colorant transfer component 30 are laminated together as shown schematically in FIG. 3. In the lamination process, a colored layer on the colorant transfer component (See, for example, colorant 33 in FIG. 2A.) is applied to the image layer 40 on the imageable component. In a preferred embodiment shown in FIG. 3, the light reflecting pigment layer 36 (See FIG. 2B) is applied to the image layer 40. The lamination step may be easily performed by an end user with commonly available lamination equipment. The temperature and pressure required for the lamination step may vary widely depending on the composition of the colored layers on the colorant component, as well as the number of colored layers to be transferred. The lamination pressure and temperature should be sufficient to transfer the colored layers and adhere them to the image layer on the imageable component 10. Typical lamination temperatures are about 250–290° F. (120–145° C.) and typical lamination pressures are about 30–100 psi ($2\times10^5$–$7\times10^5$ N/m$^2$). Laminators for attachment of the pigment transfer component 30 to the imageable component 10 include, for example, those available under the trade designations "Orca III," "Orca IV" or 9542 from GBC Protec, DeForest, Wis., USA.

As noted above, the pigment transfer component may include one layer of pigment, or multiple layers of pigment, depending on the intended application and the desired effect. Multiple pigment layers may be applied in a single lamination step, or the pigment layers may be applied one at a time in successive lamination steps.

Figure 4:
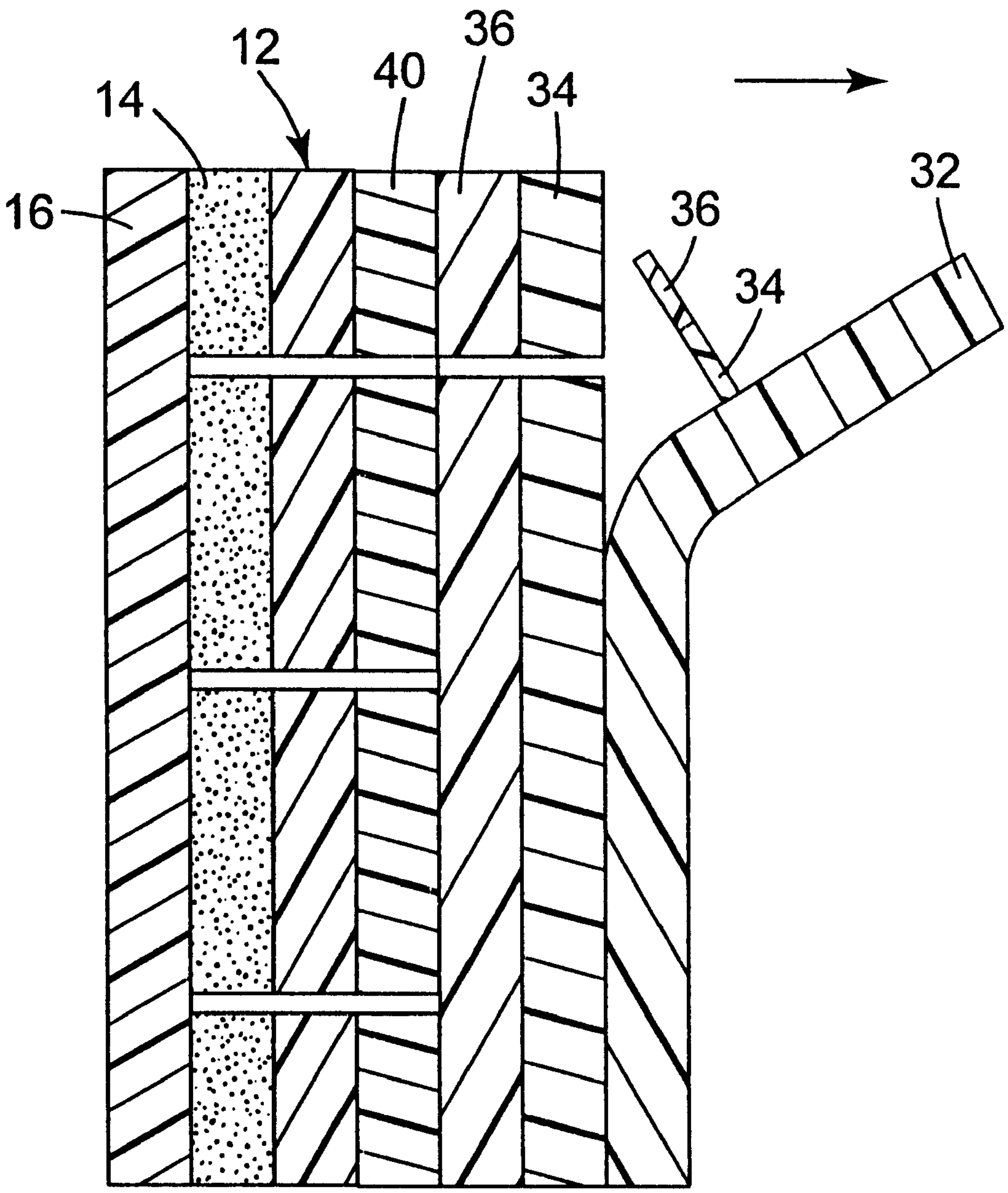
FIG. 4 is a schematic representation of the removal of the carrier film layer following lamination of the imageable component to the colorant transfer component in the process of the present invention.

Following the lamination step, as shown in FIG. 4, the carrier layer 32 is peeled away to expose the pigment layers 34 and 36. The pigments in the pigment layers 34 and 36 adhere to the image layer 40 and to the exposed land areas of the imageable film layer 12, but the pigments in the pigment layer 36 do not adhere to the apertures 19 in the imageable component 10, and substantially no bridging of the color layer occurs over the apertures.

If the optional second light reflecting pigment layer 38 (See FIG. 2, not shown in FIG. 4) is used, following removal of the carrier layer 32, the layer 38 may be imaged to form a second image layer (not shown in FIG. 4). In a second surface application, typically this second image layer will be visible to an observer on the interior of the building or room.

If the optional "holographic" layers are used (See FIG. 2, not shown in FIG. 4), a subtle, translucent pattern may be applied to the image layer 40 to provide a "holographic" optical effect for an observer viewing the image layer 40. The translucent pattern may be selected to provide any desired effect, and examples include floral patterns, concentric rings, or a circular "diffraction" pattern. After the imaging step forming the image layer 40, an optional clear protective layer (not shown in FIG. 4) may be laminated to the exposed pigment, in this case the light absorbing pigment layer 34, to prevent entry of dirt and cleaning solvents into the perforations in the completed graphic article.

Figure 5:
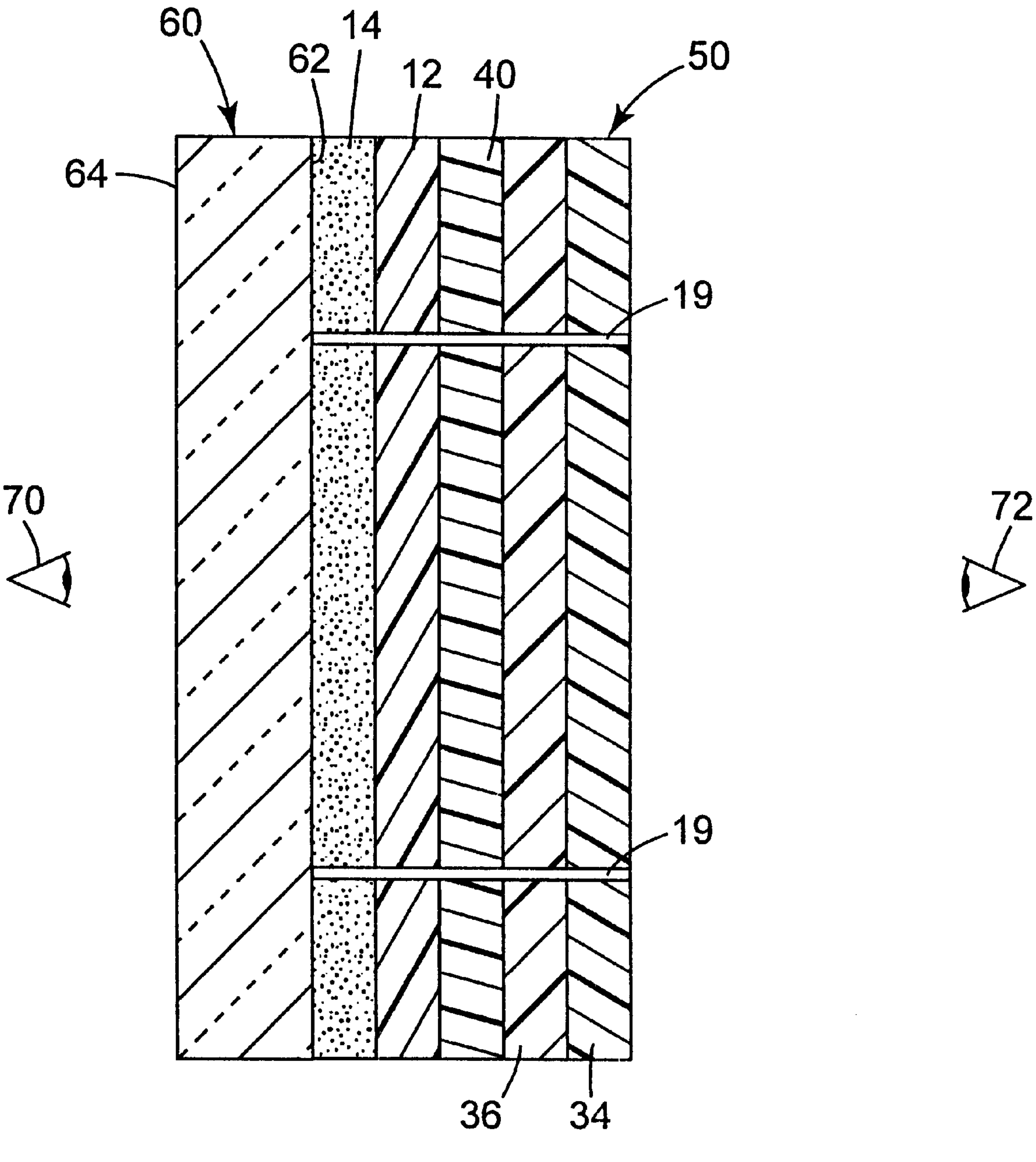
FIG. 5 is a schematic representation of the graphic article produced by the process of the present invention and affixed to a window.

Once the imageable component 10 has been laminated to the pigment transfer component 30, and the carrier layer 32 has been peeled away to expose the light absorbing pigment layer 34, the completed graphic article is ready for attachment to a substantially transparent substrate such as a window. To attach the completed graphic article to a window, the release liner 16 that overlies the pressure sensitive adhesive layer 14 is removed. Then, as shown in FIG. 5, the graphic article 50 is adhered directly to an interior surface 62 of a window 60 using the pressure sensitive adhesive layer 14. To ensure good adhesion to the window surface, it can be necessary to remove surface dirt, chemical residues and liquids from the surface prior to application of the graphic article to the surface. Typically, following removal of the release liner, the graphic article is smoothly and flatly applied in one continuous motion. The graphic article can be squeegeed flat by a roller to remove entrapped air and to provide a good adhesive bond with the underlying window surface.

After the completed graphic article is attached to the interior surface 62 of the window substrate 60, a first observer 70 that looks directly at the exterior surface 64 of the window 60 will see through the window 60 and observe the image layer 40. A second observer 72 that looks at the opaque light absorbing pigment layer 34 will see through the apertures in the image layer 40 and see light through the window. The second observer 72 will not see the image layer 40 under normal lighting conditions.

The present invention will now be described with reference to the following non-limiting examples.

EXAMPLES

Example 1

Films available from 3M Company, St. Paul, Minn., USA under the trade designation Scotchcal V6089 were used as the imageable, perforated film in this example. Scotchcal V6089 is a perforated, clear 125 um thick vinyl-acrylic film with a perforated, 50 um thick clear acrylic adhesive and a perforated paper release liner having a unperforated ethylene-vinylacetate (EVA) coated polyester (PET) film attached to the back of the liner.

A four color image was printed onto 3M 8601 Image Transfer Media using the Scotchprint Printer 2000 and 3M 8700 series toner premix and 8800 series toner concentrates. The Image was transferred from the 8601 paper to the vinyl-acrylic surface of the V6089 film by heat transfer using a GBC Protech Orca 3 Laminator as described in the 3M Instruction Bulletin 4.7 "Transfer of 3M Scotchprint Images".

A white pigment foil FL 700 006, available from Transfer Print Foils, Inc. of East Brunswick, N.J. was transfer laminated to the imaged surface of the V6089 at 270° F. (132° C.) and $3.5\times10^5$ N/$m^2$ pressure using an Orca 3 Laminator. The polyester film backing was stripped away to leave white foil only on the imaged V6089 film. The foil did not bridge the perforations in the imaged Scotchcal V6089 film. The foil transfer process was repeated applying a second layer of a white foil, AG6 298 897 from Transfer Print Foils, Inc., and then a layer of a black foil IPT 100 726, also available from Transfer Print Foils, Inc. In each step the foil bonded only to the previously applied layer of foil with no bridging over the perforations.

The release liner was removed and the adhesive coated graphic article produced above was mounted to the interior surface of a window. The image was easily viewed from outside the window. The black interior surface of the applied marking allowed for a relatively unobstructed view of the outside through the window with no apparent image observable from indoors.

Example 2

Window graphics prepared as described in example 1 were laminated on the foil side with protective films. The first sample was prepared with protective film available from 3M under the trade designation 8914 Scotchcal Electrostatic Protective Clear for Perforated Window Film. The second sample was prepared with protective film available from 3M under the trade designation 8925 Scotchcal Electrostatic Hot Transfer Protective Clear. The third sample was prepared with protective film available from 3M under the trade designation 8920 Scotchcal Electrostatic Over Print Liquid Protective Clear.

In each of the three samples the release liner was removed and the adhesive coated graphic was mounted to the interior surface of a window. The protective clear provided extra resistance to scratching of the foil and image during mounting to the window and cleaning. The image was easily viewed from outside the window. The black interior surface of the applied marking allowed for a relatively unobstructed view of the outside through the window with no apparent image observable from indoors.

Example 3

Imaged V6089 film was prepared as described in example 1. A pigment foil available from Transfer Print Foils, Inc. under the trade designation RP9 098 001 126 and having "holographic" floral images, a white foil AG6 298 897, and a black foil IPT 100 726 were sequentially transferred as in Example 1 to the imaged surface of the V6089 film.

The release liner was removed and the adhesive coated graphic produced above was mounted to the interior surface of a window. The "holographic" image was easily viewed from outside the window. The black interior surface of the applied marking allowed for a relatively unobstructed view of the outside through the window with no apparent image observable from indoors.

Example 4

A multi-color image was screen printed onto perforated V6089 film using UV screen printing inks available from 3M under the trade designation 9700 Series Screen Printing Inks. White Pigment Foils FL 700 006, AG6 298 897 and Black Pigment foil IPT 100 726 from Transfer Print Foils, Inc. were sequentially transferred to the imaged surface of the V6089 film as in example 1.

The release liner was removed and the adhesive coated graphic produced above was mounted to the interior surface of a window. The image was easily viewed from outside the window. The black interior surface of the applied marking allowed for a relatively unobstructed view of the outside through the window with no apparent image observable from indoors.

Example 5

A four color image was printed onto the ink receptive surface of media available from 3M under the trade designation 8501CP Clear Imaging Media using a Hewlett Packard HP 2000 printer and HP dye based inks. An adhesive available from 3M under the trade designation 8560 Clear Application Adhesive was laminated to the back side of the imaged 8501CP media, a 100 um thick clear polyester film with an ink jet ink receptive surface on its face side. The film, adhesive and liner were perforated using a paper punch. The perforated release liner was removed from the adhesive and replaced with non perforated release liner taken off of a sample of media available from 3M under the trade designation 3657-10 Scotchcal Opaque Imaging Media.

White Pigment Foils FL 700 006, AG6 298 897 and Black Pigment foil IPT 100 726 from Transfer Print Foils, Inc. were sequentially transferred to the imaged surface of the film as in example 1.

The release liner was removed and the adhesive coated graphic produced above was mounted to the interior surface of a window. The image was easily viewed from outside the window. The black interior surface of the applied marking allowed for a relatively unobstructed view of the outside through the window with no apparent image observable from indoors.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A process for making a graphic article comprising the steps of:

providing a perforated, substantially clear imaginable film component with a first major surface and a second major surface, said imagable film having land areas and open apertures;

forming an image layer on at least a portion of the first major surface of the imageable film component;

providing an opaque colorant transfer component comprising a carrier film having coated on a surface thereof at least one color layer;

laminating the imageable component to the opaque colorant transfer component such that at least one opaque color layer adheres to the image layer on the imageable component over said land areas and open apertures;

removing the carrier film from the colorant transfer component so that the color layer adheres to said land areas of the imagable layer and said color layer over said open apertures is removed from the graphic article with the carrier film.

2. A process as claimed in claim 1, wherein the imageable film component further comprises a substantially clear adhesive on its second major surface.

3. A process as claimed in claim 1, wherein the imageable component is a vinyl film.

4. A process as claimed in claim 1, wherein the color layers on the carrier layer are selected from the group consisting of light reflecting pigments and light absorbing pigments.

5. A process for making a graphic article comprising the steps of:

providing an imagable component comprising a perforated, substantially clear, vinyl film with an imageable first major surface and a second major surface having coated thereon a perforated, substantially clear adhesive layer, said imagable film having land areas and open apertures;

forming an image layer on at least a portion of the first major surface of the imageable film component;

providing a first opaque colorant transfer component comprising a polymeric carrier film having coated on a surface thereof at least one color layer comprising a light reflecting pigment;

laminating the imageable component to the first colorant transfer component such that the light reflecting color layer adheres to the image layer on the imageable component over said land areas and open apertures;

removing the carrier film from the first colorant transfer component so that the first colorant transfer component adheres to said land areas of the imagable layer and said first colorant transfer component over said open apertures is removed from the graphic article with the carrier film, thereby providing land areas and open apertures in said first colorant transfer component;

providing a second opaque colorant transfer component comprising a polymeric carrier film having coated on a surface thereof at least one color layer comprising a light absorbing pigment;

laminating the imageable component to the second colorant transfer component such that the light absorbing color layer adheres to the light reflecting color layer on the imageable component over said land areas and open apertures in said first colorant transfer component;

removing the carrier film from the second colorant transfer component so that the second colorant transfer component adheres to said land areas of the first colorant transfer component and said second colorant transfer component over said open apertures in said first colorant transfer component are removed from the graphic article with the carrier film, thereby providing land areas and open apertures in said second colorant transfer component.

6. A process for making a graphic article as claimed in claim 5, wherein the adhesive layer is a pressure sensitive adhesive layer.

7. A process for making a graphic article as claimed in claim 5, wherein the light reflecting pigment is a white pigment.

8. A process for making a graphic article as claimed in claim 5, wherein the light absorbing pigment is a black pigment.

9. A process for making a graphic article as claimed in claim 8, wherein the black pigment has a matte finish.

10. A process for making a graphic article as claimed in claim 5, further comprising the steps of:

providing a third colorant transfer component comprising a polymeric carrier film having coated on a surface thereof at least one color layer comprising a light reflecting pigment;

laminating the imageable component to the third colorant transfer component such that the light reflecting color layer on the third colorant transfer component adheres to the second colorant transfer component on the imageable component over said land areas and open apertures in said second colorant transfer component;

removing the carrier film from the third colorant transfer component so that the third colorant transfer component adheres to said land areas of the second colorant transfer component and said third colorant transfer component over said open apertures in said second colorant transfer component are removed from the graphic article with the carrier film.

11. A process for making a graphic article as claimed in claim 10, further comprising the step of forming an image layer on the light reflecting color layer deposited from the third colorant transfer component.

12. A process for making a graphic article as claimed in claim 5, further comprising the step of laminating a protective layer on the light absorbing color layer.

13. A process for making a graphic article comprising the steps of:

providing an imageable component comprising a substantially clear, vinyl film with an imageable first major surface and a second major surfaces wherein the second major surface has coated thereon a perforated pressure sensitive adhesive layer, and wherein the imageable component is perforated to form a plurality of apertures and a plurality of land areas surrounding the apertures, forming an image layer on at least a portion of the land areas on the first major surface of the imageable film component;

providing an opaque first pigment transfer component comprising a polymeric carrier film having coated on a surface thereof at least one color layer comprising a white pigment;

laminating the imageable component to the first pigment transfer component such that the first pigment transfer component adheres to the image layer on the imageable component over said land areas and open apertures;

removing the carrier film from the first pigment transfer component so that the first pigment transfer component adheres to said land areas of the imagable layer and said first pigment transfer component over said open apertures in the imagable layer are removed from the graphic article with the carrier film, thereby providing land areas and apertures in said first pigment transfer component;

providing an opaque second pigment transfer component comprising a polymeric carrier film having coated on a surface thereof at least one color layer comprising a black pigment;

laminating the imageable component to the second pigment transfer component such that the second pigment transfer component adheres to the first pigment transfer component on the imageable component over said land areas and open apertures in said first pigment transfer component;

removing the carrier film from the second pigment transfer component so that the second pigment transfer component adheres to said land areas of the first pigment transfer component and said second pigment transfer component over said open apertures in the first pigment transfer component are removed from the graphic article with the carrier film.

* * * * *

UNITED STATES PATENT AND TRADEMARK OFFICE

CERTIFICATE OF CORRECTION

PATENT NO. : 6,254,711 B1
DATED : July 3, 2001
INVENTOR(S) : Bull et al.

It is certified that error appears in the above-identified patent and that said Letters Patent is hereby corrected as shown below:

Column 11,
Line 41, "imaginable" should read -- imageable --.

Column 13,
Line 19, "surfaces" should read -- surface, --.

Signed and Sealed this

Sixteenth Day of April, 2002

*Attest:*

JAMES E. ROGAN
*Director of the United States Patent and Trademark Office*

*Attesting Officer*